Figure 1:
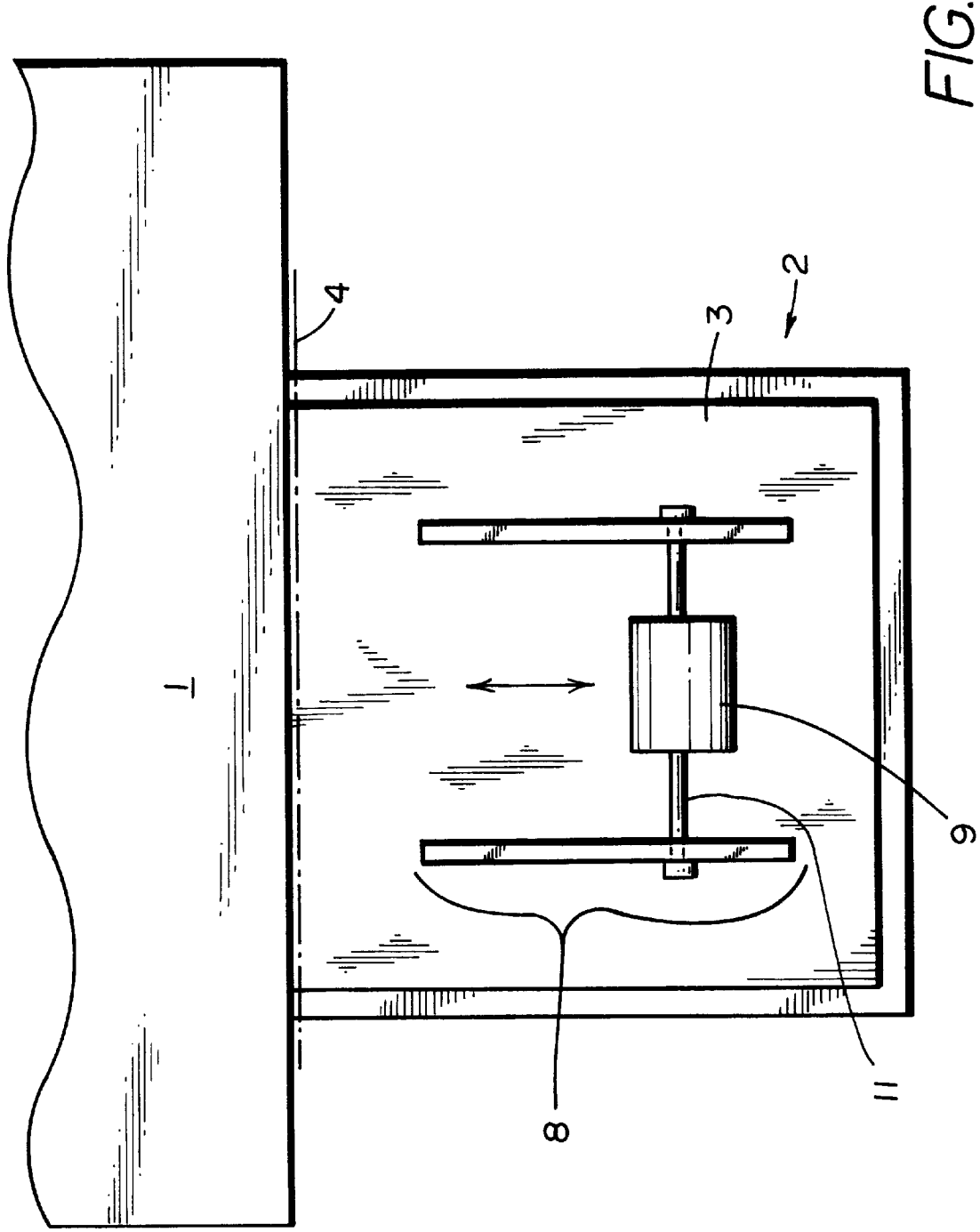

United States Patent [19]
Boutry

[11] Patent Number: 6,085,781
[45] Date of Patent: Jul. 11, 2000

[54] VALVE WITH PIVOTING FLAP AND INSTALLATION EQUIPPED WITH THE VALVE

[75] Inventor: François-Xavier Boutry, Villeneuve d'Ascq, France

[73] Assignee: Promat Air, S.A., Templeuve, France

[21] Appl. No.: 09/296,590

[22] Filed: Apr. 23, 1999

[51] Int. Cl.[7] .................................................. F16K 15/00
[52] U.S. Cl. ........................................ 137/527.8; 137/527
[58] Field of Search ................................. 137/527, 527.8, 137/527.6

[56] References Cited

U.S. PATENT DOCUMENTS

| | | |
|---|---|---|
| 1,480,942 | 1/1924 | McKee . |
| 1,584,760 | 5/1926 | Fantz . |
| 3,074,429 | 1/1963 | Farrow ................................ 137/527.8 |
| 3,613,720 | 10/1971 | Welch ................................. 137/527.8 |
| 3,710,821 | 1/1973 | Turetsky et al. . |
| 4,022,421 | 5/1977 | Carlin ..................................... 137/527 |
| 4,353,390 | 10/1982 | Karpenko ............................ 137/527.8 |
| 4,494,564 | 1/1985 | Lukacz ................................ 137/527.8 |
| 5,010,919 | 4/1991 | Partridge ............................. 137/527.8 |
| 5,201,685 | 4/1993 | Raisanen ............................. 137/527.8 |
| 5,205,311 | 4/1993 | Wilkins ............................... 137/527.8 |
| 5,983,930 | 11/1999 | Nordenberg ......................... 137/527.8 |

Primary Examiner—Gregory L. Huson
Assistant Examiner—Joanne Y. Kim
Attorney, Agent, or Firm—Miles & Stockbridge P.C.; William L. Feeney

[57] ABSTRACT

A pressure relief valve includes a flap pivoting around an axis parallel to the plane of the flap. A holder holds the flap in the closed position, which exerts a predetermined force in opposition to the force exerted by the pressure on a sealing side. The sealing side of the flap carries a skirt that extends toward the seat of the valve and cooperates with the periphery of the seat. The skirt is at a predetermined height such that the valve moves out of its initial position by a predetermined value while maintaining the seal. The holder has a mass movable relative to the flap. The mass moves from an initial position to an inactive position when the flap moves from its closed position to its open position, in order to change the flap's center of gravity and thereby reduce the force exerted by the holder.

14 Claims, 2 Drawing Sheets

VALVE WITH PIVOTING FLAP AND INSTALLATION EQUIPPED WITH THE VALVE

The invention relates to a valve with a pivoting flap.

It also relates to the installation equipped with said flap, particularly an air conditioning installation.

The air produced in an air conditioning installation, in order to be delivered to various locations, must be output from the installation with enough pressure to reach each location at a sufficient rate.

The operation of these installations is controlled with the aid of sensors which measure the temperature in each room of the building and the pressure at certain points in the distribution ducts.

The values measured by these various sensors control the installation by increasing or reducing the production of conditioned air.

A technical environment of this type must avoid any risk of excess pressure in the installation.

There are known valves comprising:
a flap pivoting around an axis parallel to the plane of the flap, which moves between a so-called closed position, in which one of the two sides of the flap called the sealing side closes a passage for the evacuation of excess pressure, and an open position, and
a means for holding the flap in the closed position, which exerts a predetermined force in opposition to the force exerted by the pressure on the sealing side.

This holding means generally consists of a spring calibrated so that the flap can only be opened gradually.

The efficiency of a system of this type is inadequate.

There is a known valve (U.S. Pat. No. 1,480,942 and U.S. Pat. No. 1,584,760) for fluids in which the holding means is constituted by a mass borne by a lever.

These valves are entirely unsuitable for an air delivery system since they are not sensitive enough.

The particular object of the invention is to improve a system of this type, and to this end, the subject of the invention is a valve of the above-mentioned type comprising:
a flap pivoting around an axis parallel to the plane of the flap, which flap moves between a so-called closed position, in which one of the two sides of said flap called the sealing side closes a passage for the evacuation of excess pressure, and an open position, and
a means for holding the flap in the closed position, which exerts a predetermined force in opposition to the force exerted by the pressure on the sealing side, which flap is characterized in that:
the sealing side of the flap carries a skirt that extends toward the seat of the valve, while cooperating with the periphery of said seat and this skirt at a predetermined height, allowing the valve to move out of its initial position by a predetermined value while maintaining the seal, and
the holding means comprises a mass, movable relative to the flap, which moves from an initial position to a so-called inactive position when the flap moves from its closed position to its open position, in order to change the flap's center of gravity and, in the above-mentioned direction of operation, to reduce the force exerted by this means.

Another subject of the invention is the installation equipped with said valve.

Figure 2:
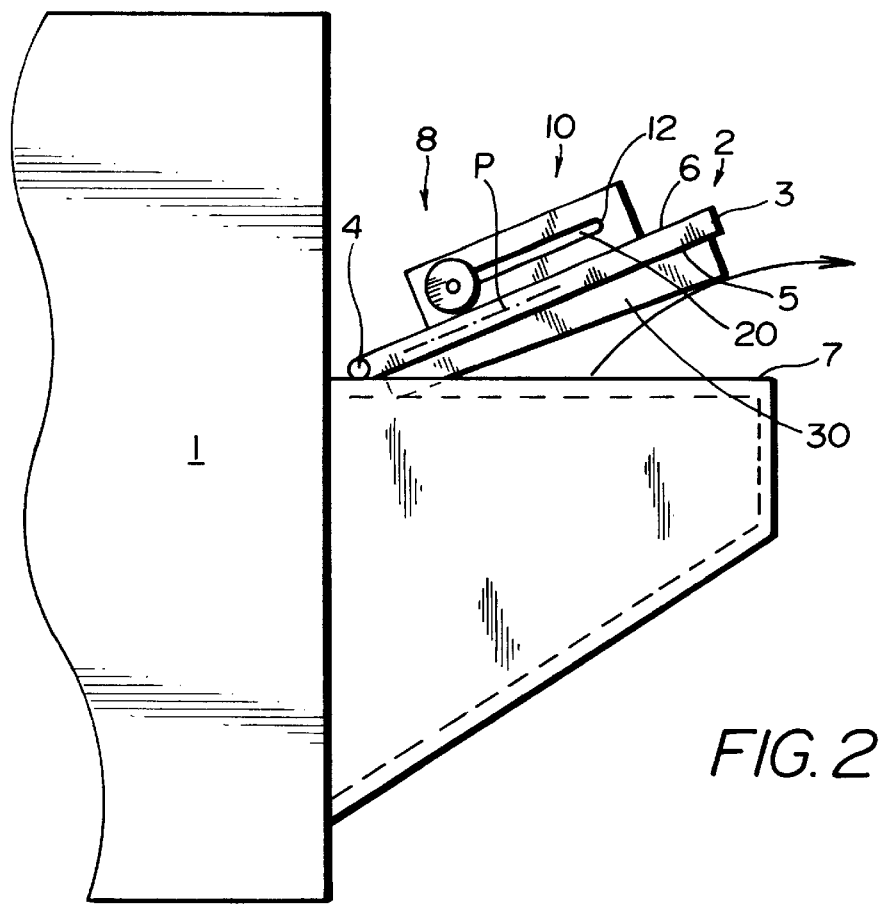
Figure 3:
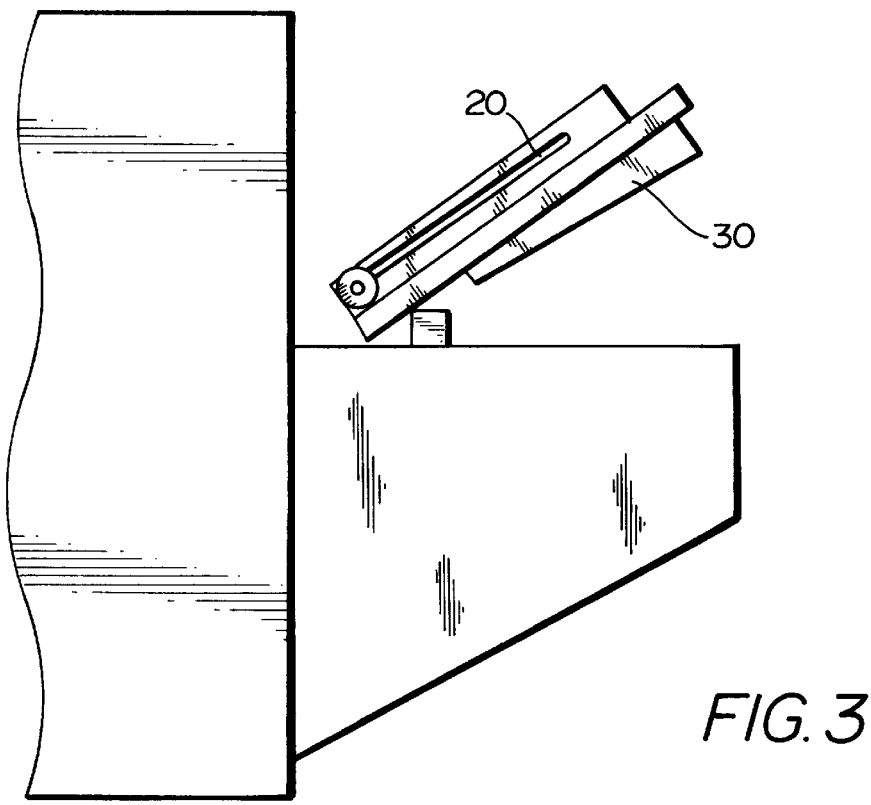

The invention will be more clearly understood with the aid of the following description, given as a non-limiting example in reference to the appended drawing, which represents:

FIG 1: front view of a valve,
FIG. 2: side view of an installation equipped with a valve,
FIG. 3: side view of an installation equipped with a variant of a valve.

The drawing shows that in order to prevent excess pressure or too strong a negative pressure in an installation 1, particularly for air conditioning, this installation comprises a valve 2.

Conventionally, this valve 2, for example a pressure relief valve, comprises:
a flap 3 pivoting around an axis 4 parallel to the plane P of the flap, which flap moves between a so-called closed position (FIG. 1), in which one 5 of the two sides 5, 6 of said flap called the sealing side 5 closes a passage 7 for the evacuation of excess pressure, and an open position (FIG. 2), and
a means 8 for holding the flap in the closed position, which exerts a predetermined force in opposition to the force exerted by the pressure on the sealing side 5.

The holding means 8 exerts a force that decreases when the flap moves from the closed position to the open position, and because of this, the opening of the flap is less impeded and occurs more rapidly, and its return to the closed position occurs only when the pressure inside the installation is substantially lower than the reference pressure in the case of a pressure relief valve, and the reverse in the case of a negative pressure relief valve.

In a preferred embodiment, the holding means 8 comprises a mass 9, movable relative to the flap, which moves from an initial position to a so-called inactive position when the flap moves from its closed position to its open position.

This movement of the mass changes the moment required to move the flap by changing the center of gravity of said flap.

In the closed position, the flap is in an approximately horizontal plane with its sealing side 5 facing downward and its other side 6 called the control side carrying the mass 9, which moves between a point distant from the flap's axis of rotation and a point closer to this axis of rotation.

Advantageously, the so-called sealing side carries a skirt 30 that extends toward the seat of the valve, while cooperating with the periphery of said seat and this skirt at a predetermined height, allowing the flap to move out of its initial position by a predetermined value while maintaining the seal.

The bottom edge of the skirt is inclined relative to the plane of the valve, with the height of the skirt increasing as it extends away from the valve's axis of rotation.

This disposition solves the problem of surges.

In effect, in case of excess pressure, it causes the movement of the flap.

In the case where there is no skirt, air immediately escapes before the flap has the time to open completely, and the pressure again falls slightly, to a value near the reference value.

Because of this, the phenomenon restarts immediately.

On the other hand, in the presence of the skirt, the flap can move out of its initial position even if the reference value has been slightly exceeded, but beyond an angular movement of the flap that is a function of the height of the skirt, the seal still being maintained, the moving mass begins its movement, becoming momentarily irreversible and thus causing the complete displacement of the flap.

The excess pressure can therefore be largely evacuated, the system operating in a similar way with a system for controlling negative pressure.

This control side carries a means 10 for guiding the moving mass in translation.

The guiding means preferably extends from one end of the flap's axis of rotation to the other.

Depending on the orientation imposed by the moving mass, this guiding means 10 and the flap's force of application will evolve differently.

In an advantageous embodiment, the mass 9 is carried by an axis 11 that passes through it, each of whose ends is guided in a slot 12.

The moving mass and its guiding means comprise a means for returning said mass to its initial position.

To this end, for example, the supporting plane 20 in which the moving mass moves is, relative to the horizontal plane defined by the flap in the closed position, inclined slightly downward from the inactive position to the initial position, so that when the flap returns to its closed position, it is the weight of the moving mass itself that rearms the system.

Instead of one mass, the device comprises two masses, each carried on one of the ends of the axis 11.

What is claimed is:

1. A valve (2) comprising:
    a flap (3) pivoting around an axis (4) parallel to a plane (P) of the flap, which flap moves between a closed position in which one (5) of the two sides (5, 6) of said flap called the sealing side (5) closes a passage (7) for the evacuation of excess pressure, and an open position, and
    a means (8) for holding the flap in the closed position, which exerts a predetermined force in opposition to the force exerted by the pressure on the Sealing side (5), which valve is characterized in that;
    the sealing side of the flap carries a skirt (30) that extends toward the seat of the valve, while cooperating with the periphery of said seat and the skirt at a predetermined height, allowing the valve to move out of its initial position by a predetermined value while maintaining the seal, and
    the holding means (8) comprises a mass (9), movable relative to the flap, which moves from an initial position to an inactive position when the flap moves from its closed position to its open position, in order to change the flap's center of gravity and thereby reduce the force exerted by the holding means (8).

2. The valve according to claim 1 characterized in that, in the closed position, a control side (6) opposite the sealing side carries the mass (9), which moves between a point distant from the flap's axis of rotation and a point closer to this axis of rotation.

3. The valve according to claim 2, characterized in that the control side carries a means (10) for guiding the moving mass in translation.

4. The valve according to claim 3, characterized in that the mass (9) is carried by an axis (11) that passes through it, each of whose ends is guided in a slot (12).

5. Installation characterized in that it is equipped with said pressure relief valve according to claim 4.

6. The valve according to claim 4, characterized in that the moving mass and its guiding means comprise a means for returning said mass to its initial position.

7. Installation characterized in that it is equipped with said pressure relief valve according to claim 6.

8. The valve according to claim 3, characterized in that the moving mass and its guiding means comprise a means for returning said mass to its initial position.

9. Valve according to claim 8, further including a supporting plane (20) in which the moving mass moves, and wherein the supporting plane is, relative to the horizontal plane defined by the flap in the closed position, inclined slightly downward from the inactive position toward the initial position, so that when the flap returns to its closed position, it is the weight of the moving mass itself that rearms the system.

10. Installation characterized in that it is equipped with said pressure relief valve according to claim 9.

11. Installation characterized in that it is equipped with said pressure relief valve according to claim 8.

12. Installation characterized in that it is equipped with said pressure relief valve according to claim 3.

13. Installation characterized in that it is equipped with said pressure relief valve according to claim 2.

14. Installation characterized in that it is equipped with said pressure relief valve according to claim 1.

* * * * *